United States Patent [19]
Yoshida

[11] Patent Number: 4,796,282
[45] Date of Patent: Jan. 3, 1989

[54] FRAME SYNCHRONIZATION DETECTION SYSTEM

[75] Inventor: Norio Yoshida, Tokyo, Japan

[73] Assignee: NEC Corporation, Japan

[21] Appl. No.: 1,409

[22] Filed: Jan. 7, 1987

[30] Foreign Application Priority Data

Jan. 9, 1986 [JP] Japan .................................... 61-2446
Jul. 2, 1986 [JP] Japan .................................. 61-156410
Aug. 26, 1986 [JP] Japan ................................ 61-201042

[51] Int. Cl.$^4$ ............................................. H04L 7/00
[52] U.S. Cl. ..................................... 375/116; 370/105
[58] Field of Search ............... 375/111, 112, 114, 116; 370/105

[56] References Cited

U.S. PATENT DOCUMENTS 3,952,162 4/1976 Texier et al. .......................... 370/105
4,316,284 2/1982 Howson ........................... 375/116 X
4,594,728 6/1986 Niquel et al. ....................... 375/116

Primary Examiner—A. D. Pellinen
Assistant Examiner—Derek S. Jennings
Attorney, Agent, or Firm—Ostrolenk, Faber, Gerb & Soffen

[57] ABSTRACT

In a frame synchronization system for synchronizing a frame consisting of N sub-frames each consisting of M bits, a transmitting side includes a circuit for generating an N-bit cyclic code from a generating polynomial and sequentially and respectively inserting bits of the cyclic code in bit positions of the sub-frames, and a receiving side includes a divider for dividing a code polynomial having N-bit values of the data trains as coefficients by the generating polynomial to output the remainder, and a frame synchronization detector for sending a frame synchronization clock signal to the N-bit data train producing circuit when the remainder from the divider is zero.

5 Claims, 6 Drawing Sheets

FRAME SYNCHRONIZATION DETECTION SYSTEM

BACKGROUND OF THE INVENTION

The present invention relates to a synchronization detection system and, more particularly, to a synchronization detection system used in a digital transmission system for trunk transmission, public network, or subscriber network.

Figure 1:
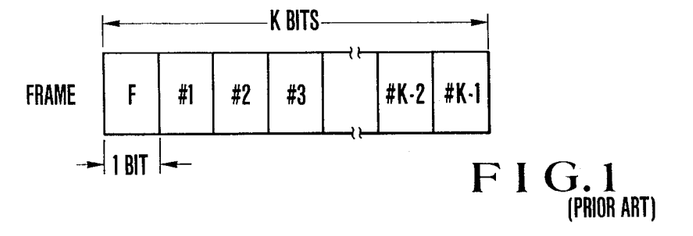
FIGS. 1 and 2 are data formats for explaining conventional frame synchronization detection systems, respectively.

Transmission techniques using optical fibers as transmission media have been developed and advanced, and transmission at several hundreds of Mbps to several Gbps has become possible. A time-divisional multiplex system can be used to effectively utilize a digital transmission system having a large capacity. However, since high-speed processing is required, frame formatting is simplified as much as possible to obtain a compact, simple circuit arrangement. A technique for simplifying frame formatting is a time-divisional bit multiplex system, a general configuration of which is illustrated in FIG. 1. Referring to FIG. 1, one frame consists of K bits, and each bit is assigned to one channel. One of the K channels is assigned to the frame channel. Referring to FIG. 1, reference symbol F denotes a frame channel. Bit positions #1 to #K−1 are respectively assigned to (K−1) channels. According to this system, a specific frame pattern is inserted in the frame channels F of a few frames in order to perform bit multiplexing. At the time of synchronization detection, data signals are separated in units of channels, and a signal train separated from any channel is checked to determine whether it coincides with the specific frame pattern inserted in the frame channel F, thereby detecting the frame channel and hence synchronization.

Figures 2, 3:
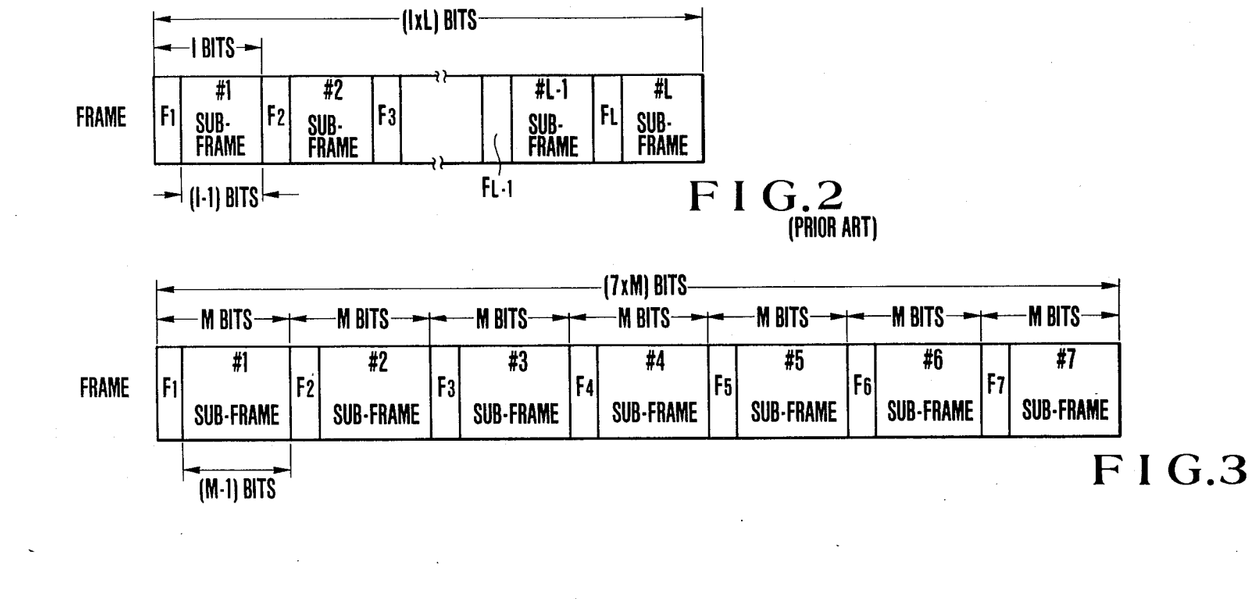
FIG. 3 is a data format of a frame in a frame synchronization detection system according to an embodiment of the present invention.

According to another conventional technique for simplifying frame formatting, a frame is divided into a plurality of sub-frames, and the frame pattern is distributed into the sub-frames. A frame employing this technique is shown in FIG. 2. Referring to FIG. 2, one frame is divided into L sub-frames, and each sub-frame comprises I bits, so that one frame consists of I×L bits. The bits constituting the frame pattern are sequentially inserted in most significant bits (MSBs) of the sub-frames. Reference symbol $F_i$ (i=1, 2, ... L) denotes a frame bit inserted in the MSB of each sub-frame; and #1 to #L, sub-frames each consisting of I bits. According to this system, $(F_1F_2F_3, \ldots F_{L-1}F_L)$ is the frame pattern. In order to detect synchronization or an alignment signal, the frame pattern $(F_1F_2F_3 \ldots F_{L-1}F_L)$ is detected from the separated signal train. The frame pattern need not be inserted in all MSBs $F_1$ to $F_L$ of the sub-frames. For example, the frame pattern is inserted in frame bit positions $F_1, F_3, \ldots$, and the remaining frame bits $F_2, F_4, F_6, \ldots$ can be used for transmitting information for a transmission line monitor and a service monitor.

In the bit multiplex system shown in FIG. 1, one of the K bits of each frame is used as a frame channel F. In order to obtain a compact, simple circuit, the length of K bits cannot be excessively long. For this reason, an overhead of the frame pattern in the entire transmission data, i.e., a ratio 1/K of the signal component of the frame pattern is a large value. The overhead is expected to increase when the transmission capacity is increased and the bit rate is increased. When system reliability and service of the system are taken into consideration, channels for transmitting information such as a transmission line monitor and a service monitor are required. As a result, the above tendency becomes more conspicuous. In the system (FIG. 2) wherein the frame is divided into sub-frames and the frame pattern is distributed into the sub-frames, a signal train coinciding a specific frame pattern $(F_1F_2F_3, \ldots F_{L-1}F_L)$ must be detected from the separated signal trains to detect synchronization, thereby guaranteeing frame and sub-frame synchronization. Transmission line monitor information and service monitor information are inserted in the frame bits $F_1$ to $F_L$, or the number L of sub-frames within one frame or the number I of bits of the sub-frame is increased to allow information transmission having a small overhead with respect to the total volume of data to be transmitted, without complicating the circuit arrangement. However, once a synchronization error occurs, hunting for a maximum of one frame is required to detect a signal train coinciding with the frame pattern $(F_1F_2F_3, \ldots F_{L-1}F_L)$ from the separated signal trains, and a maximum synchronization time required for restoring synchronization is L×I×1 frame (seconds). Therefore, if the number L of sub-frames or the number I of bits of the sub-frame is increased, the average time required for detecting the frame pattern $(F_1F_2F_3, \ldots F_{L-1}F_L)$ upon occurrence of a synchronization error is undesirably prolonged.

SUMMARY OF THE INVENTION

It is an object of the present invention to provide a synchronization detection system suitable for a large-capacity transmission system, wherein an overhead of the volume of signals of the frame pattern to a total volume of transmission data can be minimized without increasing or complicating the circuit arrangement, the frame pattern can be easily detected, and the average time required for restoring synchronization can be shortened.

In order to achieve the above object of the present invention, there is provided a frame synchronization detection system in a digital transmission system, wherein a frame consisting of N sub-frames each consisting of M bits is synchronized, comprising, at a sending side, means for generating an N-bit cyclic code from a generating polynomial and sequentially and respectively inserting bits of the cyclic code in bit positions of the sub-frames, and, at a receiving side, means for extracting a reception signal for every M bits and producing an N-bit data train, dividing means for dividing a code polynomial having N-bit values of the data trains as coefficients by the generating polynomial to output a remainder, and clock control means for sending a frame synchronization clock signal to the N-bit data train producing means when the remainder from the dividing means is zero.

DETAILED DESCRIPTION OF THE PREFERRED EMBODIMENTS

A synchronization detector according to the present invention will be described hereinafter.

FIG. 3 is a data format of a frame according to the present invention. Referring to FIG. 3, one frame is divided into seven sub-frames, and each frame consists of M bits. Therefore, one frame consists of ($7 \times M$) bits. The bits of the frame are sequentially distributed in the MSBs of the sub-frames. Referenc symbol $F_i$ ($i=1, 2, \ldots, 7$) denotes a frame bit inserted in the MSB of each sub-frame; and #1 to #7, M-bit sub-frames. The frame pattern is given as follows:

$$(F_1 F_2 F_3 F_4 F_5 F_6 F_7) = (1100010) \tag{1}$$

In general, if a code word is given as $(a_0 a_1 a_2, \ldots a_{n-1})$, $a_0$ corresponds to $(n-1)$th order; $a_1$, to the $(n-2)$th order; and $a_{n-1}$, to the 0th order. Therefore, a code polynomial $F(x)$ is represented by:

$$F(x) = a_{n-1} + a_{n-2}X + a_{n-3}X^2 + \ldots + a_1 X^{n-2} + a_0 X^{n-1} \tag{2}$$

the code length is n, and the term $a_0$ of the highest order appears first along the time basis. The terms of lower orders then appear, and finally the term $a_{n-1}$ appears.

As is apparent from polynomial (2), when the code word consists of a 7-bit string, the code polynomial $F(x)$ can be expressed by a polynomial of the sixth order. In this case, equation (1) is rewritten as follows:

$$F(x) = X + X^5 + X^6 \tag{3}$$

If the generation polynomial $G(x)$ is defined as:

$$G(x) = 1 + X + X^3 \tag{4}$$

and if a polynomial as $Q(x)$ satisfying the following equation (5) is present:

$$F(x) = Q(x) G(x) \tag{5}$$

the polynomial (3) is generated from the generating polynomial (4). Polynomial $Q(x)$ satisfying this is given by:

$$Q(x) = X + X^2 + X^3 \tag{6}$$

This is a polynomial having an input bit string (1110) as its coefficient.

As is apparent from the above description, polynomial (4) generates the frame pattern (1100010). In a binary system, i.e., modulo 2, if n is given as a code length, a code word generated from $G(x)$ which divides $X^n + 1$ without a remainder becomes a cyclic code. Therefore, generating polynomial (4) is given as $$\begin{aligned}(X^7 + 1)/G(x) &= (X^7 + 1)/(X^3 + X + 1) \\ &= X^4 + X^2 + X + 1\end{aligned} \tag{7}$$

and $(X^7+1)$ can be divided by $(X^4+X^2+X+1)$ without a remainder. Therefore, the code word of a code length 7 generated by generating polynomial (4) becomes a cyclic code as follows:

$$W = \begin{vmatrix} 1100010 \\ 1000101 \\ 0001011 \\ 0010110 \\ 0101100 \\ 1011000 \\ 0110001 \end{vmatrix} \tag{8}$$

The components of each row of a matrix W in equation (8) generate a cyclic code having a code length 7. If $W_1, W_2, \ldots W_7$ are given as follows:

$$W_1 = (1100010) \tag{9-1}$$

$$W_2 = (1000101) \tag{9-2}$$

$$W_3 = (0001011) \tag{9-3}$$

$$W_4 = (0010110) \tag{9-4}$$

$$W_5 = (01001100) \tag{9-5}$$

$$W_6 = (1011000) \tag{9-6}$$

$$W_7 = (0110001) \tag{9-7}$$

and they serve as coefficients, respectively, the code polynomial can be divided by generating polynomial (4) without a remainder. A minimum humming distance d of the cyclic code is solely determined according to selection of a generating polynomial and a code length. A minimum humming distance for a code length of 7 and polynomial (4) as a generating polynomial is given as follows:

$$d = 3.$$

Figure 4:
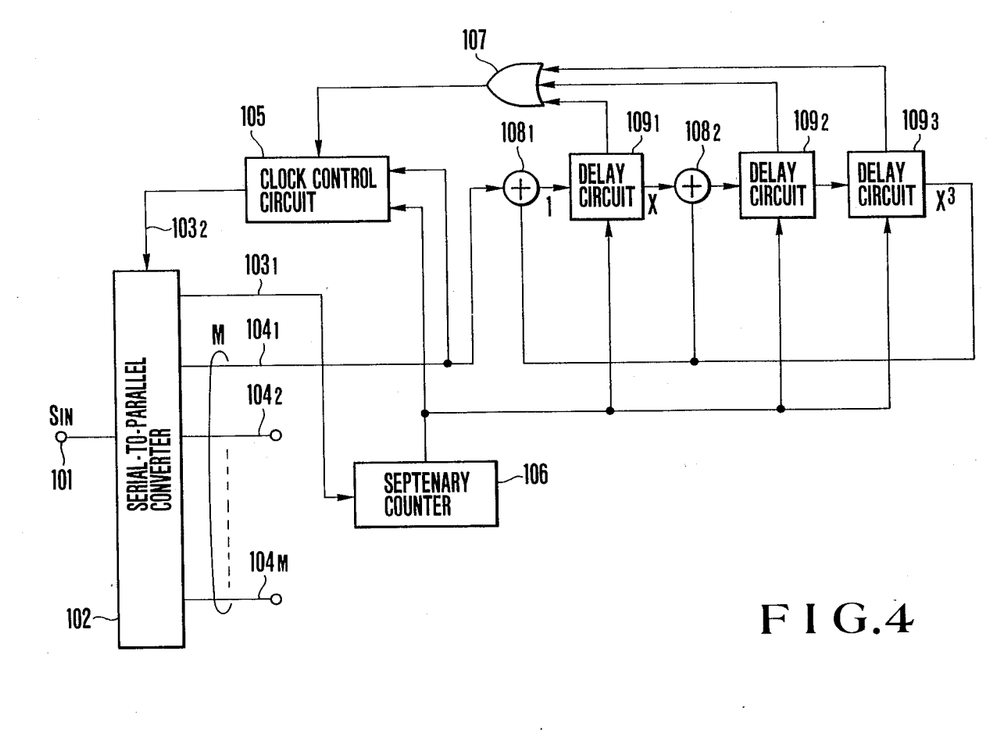
FIG. 4 is a block diagram of a synchronization detector for the frame in FIG. 3.

FIG. 4 shows a synchronization detector according to an embodiment of the present invention. This synchronization detector detects synchronization by using the frame shown in FIG. 3. Referring to FIG. 4, reference numeral 101 denotes an input terminal of information $S_{IN}$; 102, a serial-to-parallel converter; $103_1$, a clock line; $103_2$, a clock control signal line; $104_1$ to $104_M$, M parallel information lines, respectively; 105, a clock control circuit; 106, a septenary counter; 107, a control gate (i.e., an OR circuit); $108_1$ and $108_2$, adders of modulo 2, respectively; and $109_1$, $109_2$, and $109_3$, one-sub-frame delay circuits, respectively. Referring to FIG. 4, information having a frame format in FIG. 3 is input to the serial-to-parallel converter 102 through the input terminal 102. The serial-to-parallel converter 102 converts a serial input into parallel outputs respectively appearing on the M information lines $104_1$ to $104_M$. The information line $104_1$ is connected to inputs of the clock control circuit 105 and the adder 108 of modulo 2. The adders $108_1$ and $108_2$ of modulo 2 and delay circuits $109_1$ to $109_3$ constitute a divider for dividing an input by generating polynomial (4), i.e., $G(x)=1+X+X^3$.

The septenary counter 106 receives a (f0/7)-Hz clock signal from the serial-to-parallel converter 102 through the clock line 103 if a transmission rate corresponds to f0 (Hz). The counter 106 generates an output signal for every septenary count. This signal is supplied to the delay circuits $109_1$ to $109_3$ which are then cleared. Therefore, the divider divides a code polynomial concretized in a 7 bits code word by generating polynomial (4). These code words are sequentially transmitted through the information line $104_1$ for every frame period. The remainder upon division appears as outputs from the delay circuits $109_1$ to $109_3$. The above operation amounts to sequentially dividing a code polynomial consisting of a code word of a bit train constituted by the bits respectively extracted from the seven sub-frames by generating polynomial (4). If the remainder is zero, that is, the values of the outputs from the delay circuits $109_1$ to $109_3$ are zero, the signals sent through the information line $104_1$ constitute a frame pattern distributed in the MSBs of the sub-frames. If even one of the outputs from the delay circuits $109_1$ to $109_3$ is not zero, the signal sent through the information line $104_1$ is not a frame pattern. In this manner, the frame pattern can be easily detected. When the remainder is zero, the 7-bit word frame pattern can be represented by one of equations (9-1), (9-2), . . . (9-7). If the remainder is zero, sub-frame synchronization is established. If the remainder is not zero, synchronization detection cannot be performed. In other words, an asynchronization state is obtained. In this state, synchronization detection is performed. In order to establish the sub-frame synchronization, hunting is performed for a maximum of the sub-frame length M. In the worst case, the synchronization restoration time is M×1 frame (seconds). Upon establishment of the sub-frame synchronization, a 7-bit word sent for one frame period is searched, and frame synchronization is established. At this time, all bits of one word need not be searched. As is apparent from equations (9-1), (9-2), . . . (9-7), at least three bits need be searched. Since the three bits are excluded each other, frame synchronization can be established upon searching these three bits. More specifically, detection is immediately judged as to what frame pattern allows establishment of the sub-frame synchronization. By using such information, after sub-frame synchronization is established, frame synchronization can be easily and immediately performed. The control gate 107 comprises an OR gate for detecting whether the remainder is zero in response to the outputs from the delay circuits $109_1$ to $109_3$. The output from the control gate 107 is supplied to the clock control circuit 5. The clock control circuit 105 also receives outputs from the information line $104_1$ and the septenary counter 106. The clock control circuit comprises a read-only memory (ROM) having input/output characteristics shown in Table 1 below.

TABLE 1

| a | x |
|---|---|
| #0 | 5 |
| #1 | 4 |
| #2 | 3 |
| #3 | 1 |
| #4 | 6 |
| #5 | 2 |

TABLE 1-continued

| a | x |
|---|---|
| #6 | 0 |

In Table 1, value a indicates a decimal value of the first three bits of the 7-bit frame pattern sent from the information line $104_1$. The value a serves as a ROM input (read address). Value x is data prestored at each address and serves as a ROM output. For example, if $W_7=(0110001)$ represented by equation (9-7) is sent from the information line $104_1$, the input (read address) is a=3, and the output is x=1. The output x represents a phase difference between sub-frames of the 7-bit word frame pattern sent through the information line $104_1$ and the frame pattern $W_1=(1100010)$ represented by equation (9-1). If the frame pattern $W_1=(1100010)$ is sent from the information line $104_1$, then x=0. By using the ROM output information, the output from the control gate 107, and the output from the septenary counter 106, sub-frame synchronization is checked. At the same time, control information for frame synchronization is sent to the serial-to-parallel converter 102 through the clock control signal line $103_2$, thereby establishing frame synchronization.

In the above example, the number of sub-frames in one frame is 7, the generating polynomial is $1+X+X^3$, and the cyclic code is (1100010). However, the present invention is not limited to the above combination. Various other combinations may be used. In addition, the bits of the frame pattern need not be inserted in the MSBs of the sub-frames, respectively. For example, the bits of the frame pattern may be inserted in every other MSBs of the sub-frames, and the remaining MSBs may be used for transmitting information such as a transmission line monitor and a service monitor.

Figure 5:
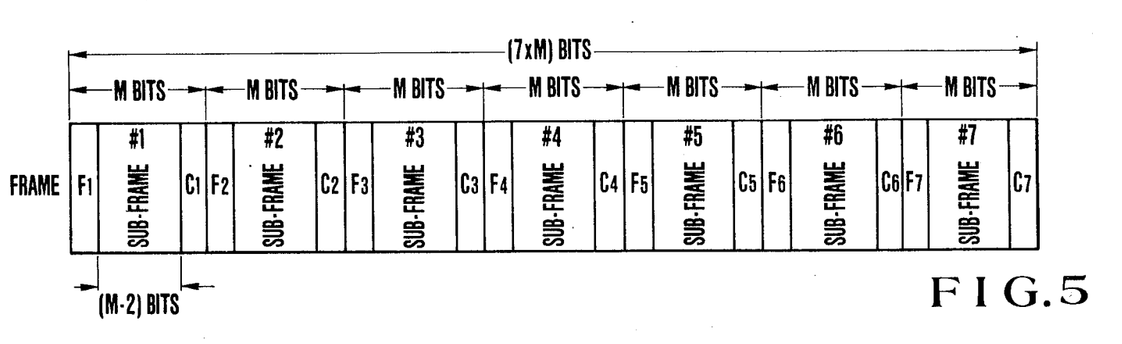
FIG. 5 is a data format of a frame for a frame synchronization system according to another embodiment of the present invention.

FIG. 5 shows a format of a frame according to another embodiment of the present invention. Referring to FIG. 5, one frame is divided into seven sub-frames, and each sub-frame consists of M bits. Therefore, one frame consists of (7×M) bits. The bits of the frame pattern are respectively inserted in the MSBs of the sub-frames. In addition, the bits of the 7-bit cyclic code are respectively inserted in the least significant bits (LSBs) of the sub-frames. Reference symbol $F_i$(i=1, 2, . . . 7) denotes a frame bit inserted in the MSB of each sub-frame. Reference symbol $C_i$(i=1, 2, . . . 7) denotes the bit of the 7-bit cyclic code which is inserted in the LSB of each sub-frame. Reference symbols #1 to #7 denote sub-frame numbers each consisting of M bits.

Figure 6:
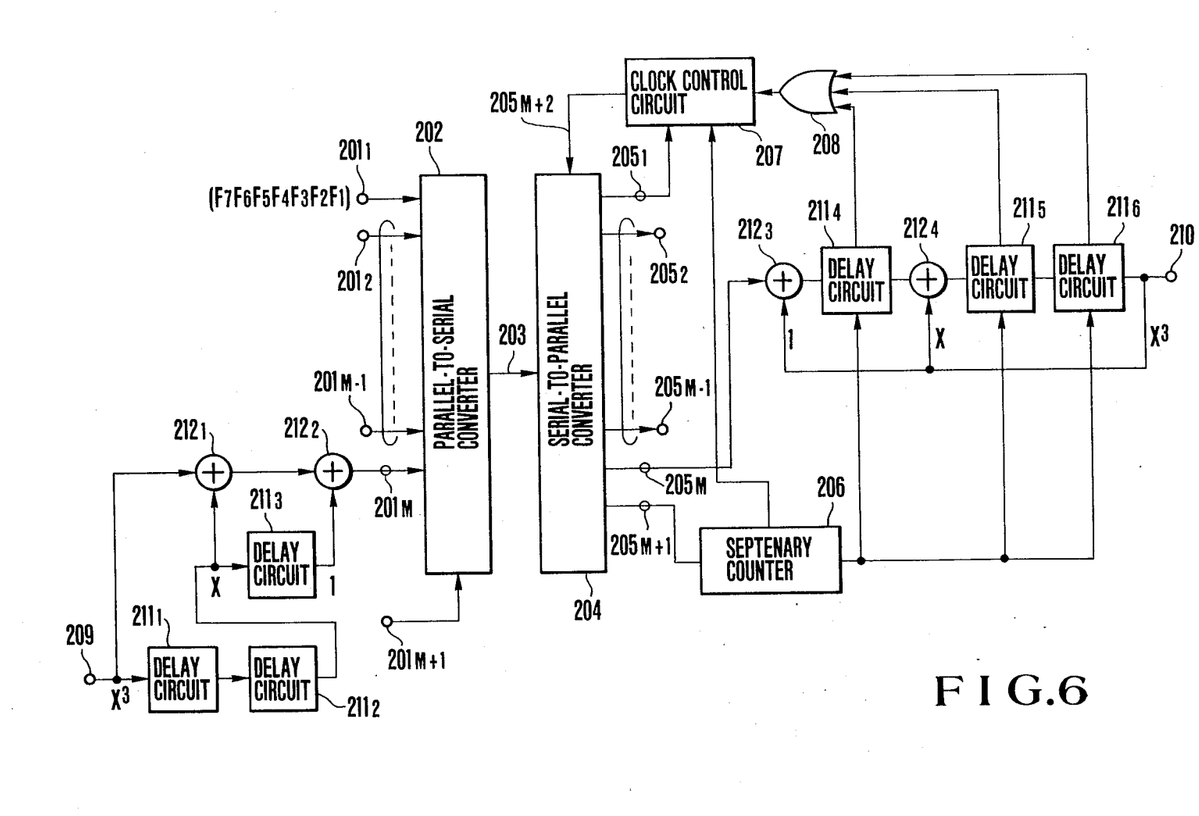
FIG. 6 is a block diagram of a synchronization detector for the frame in FIG. 5.

FIG. 6 is a synchronization detector for performing synchronization of the frame shown in FIG. 5. Referring to FIG. 6, reference numerals $201_1$ to $201_M$ denote information input terminals; $201_{M+1}$, a clock input terminal; 202, a parallel-to-serial converter; 203, a signal line; 204, a serial-to-parallel converter; $205_1$ to $205_M$, parallel-converted information output terminals, respectively; $205_{M+1}$, a clock line; $205_{M+2}$, a clock control signal line; 206, a septenary counter; 207, a clock control circuit; 208, a control gate; 209, a control signal input terminal; 210, a control signal output terminal; $211_1$ to $211_6$, one-sub-frame delay circuits, respectively; and $212_1$ to $212_4$, adders of modulo 2, respectively.

The frame pattern $(F_1F_2F_3F_4F_5F_6F_7)$ shown in FIG. 5 is input to the information input terminal $201_1$ in FIG. 6. The number of types of input bit trains which may be input from the control signal input terminal 209 is ($2^4-1$). It is possible to assign information such as transmission line monitor information and service monitor information to this bit train.

Assume that an input bit train is I=(1110). The one-sub-frame delay circuits $211_1$ to $211_3$ and the adders $212_1$ and $212_2$ of modulo 2 constitute a cyclic code generator for generating a 7-bit word cyclic code. The contents of the delay circuits $211_1$ to $211_3$ are cleared for every frame, and the adders $212_1$ and $212_2$ of modulo 2 together with the delay circuits $211_1$ and $211_3$ constitute a multiplier using generating polynomial $G(x)=1+X+X^3$ (4), thus allowing multiplications for every frame synchronization. The input bit train I=(1110) and the code word $W_0$=(1100010) generated by generating polynomial $G(x)=1+X+X^3$ (4) are input from the information input terminal $201_M$. The pieces of information input from the information input terminals $201_1$ to $201_M$ are converted into a frame (FIG. 5) by the parallel-to-serial converter 202. ($C_1C_2 ... C_n$) in FIG. 5 corresponds to the code word $W0$=(1100010)=($C_1C_2C_3C_4C_5C_6C_7$). The clock signal is input from the clock line $201_{M+1}$. Information converted into the serial signal by the parallel-to-serial converter 202 is transmitted to the serial-to-parallel converter 204 through the signal line 203. The converter 204 converts the serial signal into M parallel signals. Information at the terminal $205_1$ which serves as one train of parallel converted information is input to the clock control circuit 207. Information at the terminal $205_M$ which serves as the other train is input to the adder $212_3$ of modulo 2. The adders $212_3$ to $212_4$ of modulo 2 and one-sub-frame delay circuits $211_4$ to $211_6$ constitute a divider using generating polynomial $G(x)=1+X+X^3$ (4). A (f0/7)-Hz clock signal is supplied from the serial-to-parallel converter 204 to the septenary counter 206 if the transmission rate corresponds to f0. By using the output from the septenary counter 206, the contents of the delay circuits $211_4$ to $211_6$ for every one-frame interval are cleared. Therefore, the divider divides the polynomial of a 7-bit code word by the generating polynomial (4). The code word is sent using information at the sequential terminal $205_M$ for every frame. The remainder upon division by the divider appears as outputs at the delay circuits $211_4$ to $211_6$, and the resultant quotient appears at the control signal output terminal 210. This indicates that the code polynomials each having a code word of a bit train constituted by bits extracted from the seven sub-frames are divided by generating polynomial (4). If the values of all outputs from the delay circuits $211_4$ to $211_6$ upon completion of the division are zero, the signal sent from the terminal $205_M$ is a code word serving as a cyclic code whose bits are distributed in and assigned to the LSBs of the sub-frames. However, even if one of the outputs from the delay circuits $211_4$ to $211_6$ is not zero, the signal sent from the terminal $205_M$ is not a code word serving as the a cyclic code. In this manner, a code word serving as a cyclic code of bits distributed in and assigned to the LSBs of the sub-frames can be easily detected. If a bit train input to the control input terminal 209 is I=(1110), in the 7-bit word code pattern sent to the terminal $205_1$ for the one-frame period, code patterns whose remainders are zero are given by equations (10-1), (10-2), ... (107). If the remainder is zero, a cyclic code pattern of bits distributed and inserted in the LSBs of the sub-frames has been detected. Thereafter, by detecting the frame pattern ($F_1F_2, ... F_7$) assigned to the MSBs of the sub-frames is detected, thereby immediately detecting frame synchronization. However, if the remainder is not zero, synchronization detection cannot be performed. In other words, nonsynchronization state is set. In this case, synchronization detection must be performed. In summary, the frame synchronization can be established by searching the cyclic code of bits respectively inserted in the LSBs of the sub-frames and searching the MSBs of the sub-frames. In the worst case, if the sub-frame length is given as M, hunting for only the (M−1) duration is required to search the cyclic code of bits distributed and inserted in the LSBs of the sub-frames. A maximum of synchronization restoration time is (M−1)×1 frame (seconds. The input bit train I for generating the cyclic code, i.e., the information input to the control input terminal 209 has a capacity of ($2^4-1$). It is thus possible to send information such as transmission line monitor information and service monitor information. For example, if the bit train input from the control signal input terminal 209 is I=(1110), an output bit train of (1110) appears at the control signal output terminal. The control gate 208 uses the outputs from the delay circuits $211_4$ to $211_6$ to determine whether the remainder by the division is zero. An output from the control gate 208 is supplied to the clock control circuit 207. The clock control circuit 207 also receives the signal from the terminal $205_1$ and the output from the septenary counter 206. The clock control circuit 207 includes a frame pattern retaining memory. The memory uses the 7-bit word frame pattern sent from the terminal $105_1$ and the output from the control gate 208 to check frame synchronization. At the same time, control information for checking frame synchronization is sent to the serial-to-parallel converter 204 through the clock control signal line $205_{M+2}$, thereby assuring frame synchronization.

In the above description, the number of sub-frames within one frame is 7, the generating polynomial is $1+X+X^3$, and a total number of control signals is $2^4-1$. However, the present invention is not limited to the above combination. Various other combinations may be used. In addition, the bits of the cyclic code pattern need not be respectively assigned to the LSBs of all the sub-frames. For example, if the number of sub-frames within one frame is increased, i.e., if a large frame is used, the bits of the cyclic code pattern may be inserted in every other LSBs to shorten the length of the cyclic code. Furthermore, the insertion positions of the bits of the cyclic code pattern need not be limited to LSBs of the sub-frames.

Figure 7:
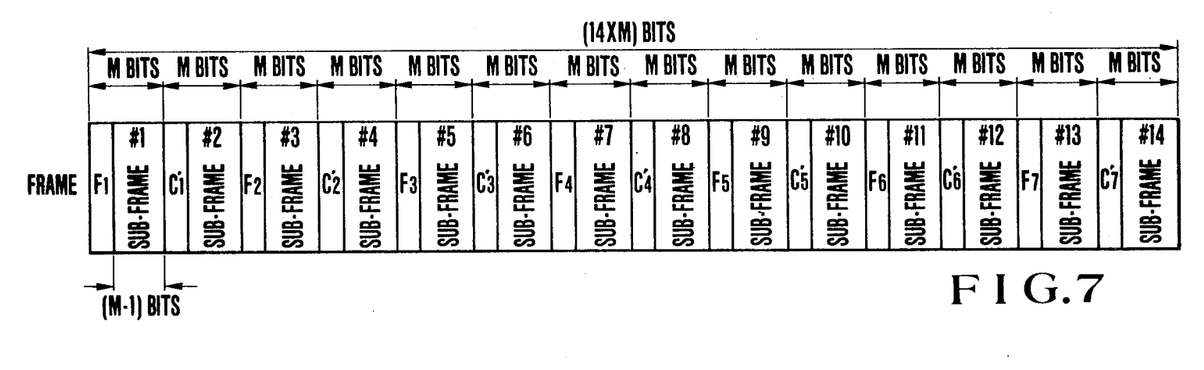
FIG. 7 is a data format of a frame according to still another embodiment of the present invention.

FIG. 7 shows a format of a frame for two other embodiments (to be referred to as embodiments 7-1 and 7-2). Referring to FIG. 7, one frame is divided into 14 sub-frames, and each sub-frame consists of M bits. Therefore, one frame consists of (14×M) bits. In the embodiment 7-1, bits of the frame pattern are respectively distributed and inserted in odd-numbered MSBs of the sub-frames. Bits of the cyclic code are respectively distributed and inserted in even-numbered MSBs of the sub-frames. Reference symbol $F_i$ (i=1, 2, ... 7) denotes a frame bit; $C_i'$(i=1, 2, ... 7), a bit of a 7-bit cyclic code; and #1 to #14, sub-frame numbers each consisting of M bits. As described above, a generating polynomial comprises polynomial $G(x)=1+X+X^3$ (4), so that a 7-bit cyclic code can be generated. Bits of the cyclic code derived from generating polynomial (4) are respectively distributed and inserted in $C_i'$(i=1, 2, ... 7). The following frame synchronization pattern is inserted:

$$(F_1F_2F_3F_4F_5F_6F_7)=(1111000) \quad (10)$$

In this case, an input bit train for generating the cyclic code may be one of 15($=2^4-1$) types of bit trains as transmission information excluding a bit train (0000).

In the embodiment 7-2, the bits of the frame pattern serving as the cyclic code are respectively distributed and inserted in the odd-numbered sub-frame MSBs, and the bits of a cyclic code present exclusively from the frame pattern serving as the cyclic code are respectively distributed and inserted in the even-numbered MSBs of the sub-frames. Reference symbol $F_i$ ($i=1, 2, \ldots 7$) denotes a frame bit of the 7-bit cyclic code; $C_i$ ($i=1, 2, \ldots 7$), a 7-bit cyclic code; and #1 to #14, sub-frame numbers each consisting of M bits. A generating polynomial for generating the cyclic code inserted in $F_i$ ($i=1, 2, \ldots 7$) and $C_i$ ($i=1, 2, \ldots 7$) is polynomial $G(x)=1+X+X^3$ (4), and the following frame synchronization pattern is used:

$$(F_1F_2F_3F_4F_5F_6F_7)=(0111010) \quad (11)$$

Equation (11) is rewritten as the following code polynomial:

$$F(x)=X+X^3+X^4+X^5 \quad (12)$$

The following division can be performed without generating any remainder:

$$F(x)/G(x) = (X^5 + X^4 + X^3 + X)/(X^3 + X + 1) \quad (13)$$
$$= X^2 + X$$

$F'(x)$ is given as a cyclic code generated by generating polynomial $G(x)=1+X+X^3$ (4).

$$W'_1=(0111010) \quad (14\text{-}1)$$
$$W'_2=(1110100) \quad (14\text{-}2)$$
$$W'_3=(1101001) \quad (14\text{-}3)$$
$$W'_4=(1010011) \quad (14\text{-}4)$$
$$W'_5=(0100111) \quad (14\text{-}5)$$
$$W'_6=(1001110) \quad (14\text{-}6)$$
$$W'_7=(0011101) \quad (14\text{-}7)$$

As is apparent from the above description, the code polynomial having coefficients $W'_1, W'_2, \ldots W'_7$ can be divided by generating polynomial (4) without remainder. The code word $W_0=(1100010)$ is also a cyclic code derived from generating polynomial (4). The code polynomial having the cyclic codes represented by equations (9-1), (9-2), ... (9-7) as coefficients are present exclusively from the code polynomial having cyclic codes represented by equations (14-1), (14-2), ... (14-7) as coefficients. The cyclic codes to be inserted in $C_i$ ($i=1, 2, \ldots 7$) are therefore cyclic codes represented by equations (9-1), (9-2), ... (9-7). In this case, the input bit trains for generating cyclic codes represented by equations (9-1), (9-2), ... (9-7) are given as follows:

$$I_1=(1110) \quad (15\text{-}1)$$
$$I_2=(1011) \quad (15\text{-}2)$$
$$I_3=(0001) \quad (15\text{-}3)$$
$$I_4=(0010) \quad (15\text{-}4)$$
$$I_5=(0100) \quad (15\text{-}5)$$
$$I_6=(1000) \quad (15\text{-}6)$$
$$I_7=(0111) \quad (15\text{-}7)$$

It is, therefore, possible to use the above input bit trains as transmission information.

Figure 8:
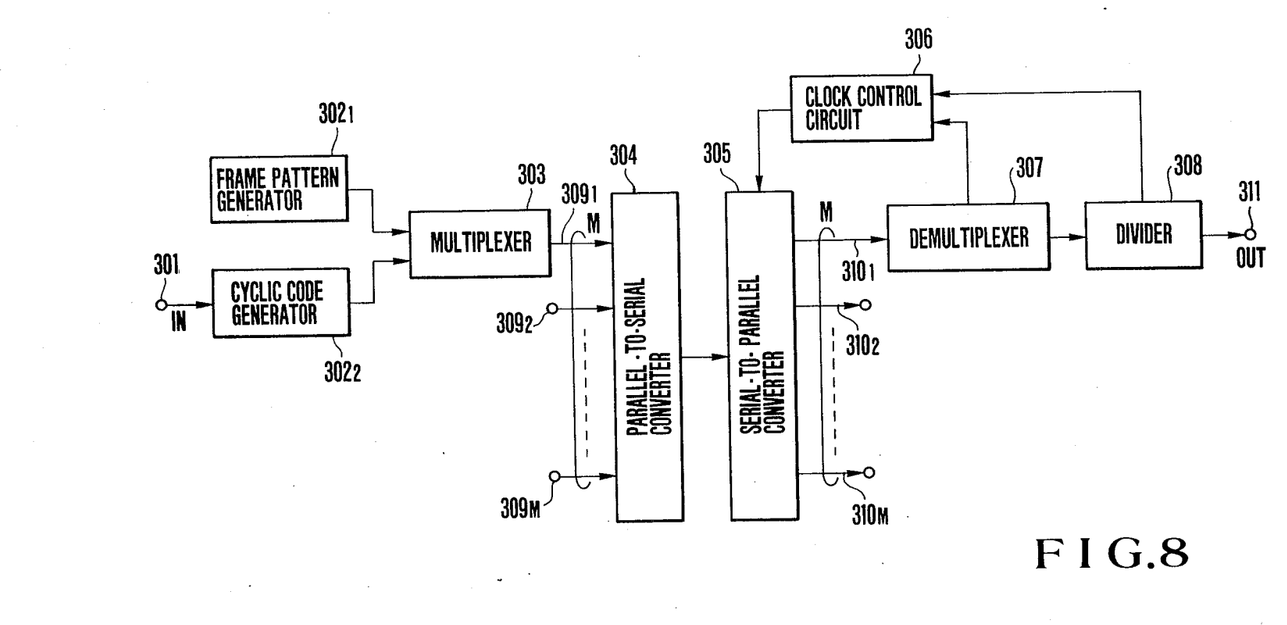
FIG. 8 is a block diagram of an arrangement of a synchronization detector for the frame in FIG. 7.

FIG. 8 shows a synchronization detector for the above-mentioned two embodiments in FIG. 7. Referring to FIG. 8, reference numeral 301 denotes a control signal input terminal; $302_1$, a frame pattern generator; $302_2$, a cyclic code generator; 303, a multiplexer; 304, a parallel-to-serial converter; 305, a serial-to-parallel converter; 306, a clock control circuit; 307, a demultiplexer; 308, a divider; $309_1$ to $309_M$, M input information lines, respectively; and 311, an output control signal line.

Referring to FIG. 8, the frame pattern generator $302_1$ generates the frame synchronization pattern described above. More specifically, the pattern (1111000) represented by equation (10) or the pattern (0111010) represented by equation (11) is generated for every frame. The cyclic code generator $302_2$ generates a 7-bit cyclic code for every frame by using generating polynomial $G(x)=1+X+X^3$. Control signals $S_{IN}$ to be input to the input terminal 301 can be 15 ($2^4-1$) types of input bit trains excluding the bit train of (0000) in the embodiment 7-1. However, in the embodiment 7-2, seven types of input bit trains represented by equations (15-1) to (15-7) can be input to the input terminal 301. Therefore, the transmission monitor information can be assigned to these input bit trains. The parallel-to-serial converter 303 time-divisionally multiplexes the frame synchronization patterns synchronously generated from the frame pattern generator $302_1$ and the two time-serial cyclic codes from the cyclic code generator $302_2$, and generates a serial signal. This output is supplied to the parallel-to-serial converter 309 through the input information line $309_1$ and is converted together with the pieces of information from the input information lines $309_2$ to $309_M$ into the frame (FIG. 7). The output from the parallel-to-serial converter 304 is supplied to the serial-to-parallel converter 305. This reception signal is extracted in units of M bits and converted into parallel signals appearing at the M output information lines $310_1$ to $310_M$. Information from the output information line $310_1$ which is one train of parallel signals is supplied to the serial-to-parallel converter 307 and is further converted into two trains of parallel signals. One train of the parallel signal is supplied to the clock control circuit 306, and the other is supplied to the divider 308. The divider 308 divides the code polynomial of the 7-bit code word sent from the serial-to-parallel converter 307 for every frame by the generating polynomial. The remainder is sent to the clock control circuit 306, and the quotient appears at the output control signal line 311. The above operation sequence can be expressed in the following manner. Among the 14 sub-frames, the code polynomial corresponding to the 7-bit code word whose bits are extracted from the seven odd- or even-numbered sub-frames is divided by the generating polynomial. In this case, if the remainder is zero, the signal sent from the output information line $310_1$ to the divider is a code word serving as a cyclic code whose bits are respectively inserted in the MSBs of the sub-frames. However, if the remainder is not zero, the signal sent from the output information line $310_1$ represents information assigned to bits excluding the MSBs of the sub-frames. In this manner, detection can be easily performed as to whether the information sent from the output information line $310_1$ constitutes a cyclic code whose bits are respectively inserted in the MSBs of the sub-frames.

A case will be described wherein the frame sent to the serial-to-parallel converter 305 is the one in the embodiment 7-1. If the remainder from the divider 308 is zero, the bit train sent from the divider 308 represents a code word serving as a cyclic code whose bits are respectively inserted in the MSBs of the even-numbered sub-frames. In this case, the positions of the MSBs of the sub-frames can be detected to assure sub-frame synchronization. In this case, even if information sent from the output information line $310_1$ represents the one inserted in the MSB of each sub-frame, the remainder from the divider 308 is not always zero. However, even if nonsynchronization state is set, hunting for a maximum of the (2M−1) (where M is the sub-frame length) period allows sub-frame synchronization restoration. In this manner, after sub-frame synchronization is assured, the bit train sent from the serial-to-parallel converter 307 represents the frame synchronization pattern whose bits are respectively assigned to the MSBs of the odd-numbered sub-frames. By searing this pattern, immediate synchronization restoration can be performed. The longest synchronization restoration time is (2M−1)×1 frame (seconds). The quotient from the divider 308 appears at the output control signal line 311. One of 15 types of bit trains may be produced as the quotient. By using the frame in the embodiment 7-1, transmitted control information can be received.

A case will be described wherein the frame sent to the serial-to-parallel converter 305 is the frame in embodiment 7-2. In the same manner as described above, if the remainder from the divider 308 is zero, the bit train sent to the divider 308 represents the cyclic code whose bits are inserted in the MSBs of the even- or odd-numbered sub-frames. In this case, the positions of the MSBs of the sub-frames can be detected, thereby assuring sub-frame synchronization. In this case, the frame synchronization pattern is also a cyclic code. Even if nonsynchronization is caused, hunting for only a maximum time of (M−1) (where M is the sub-frame length) is required for guaranteeing sub-frame synchronization. Upon assurance of sub-frame synchronization, the clock control circuit 306 detects that the bit train sent to the divider 308 is a frame synchronization pattern serving as a cyclic code or a cyclic code present exclusively from the frame synchronization pattern. The frame synchronization pattern can be immediately searched to allow synchronization restoration. A synchronization restoration time in the worst case is (M−1)×1 frame (seconds). The quotient from the divider 308 appears at the output control signal line 311, and one of the seven types of bit trains may be produced as the quotient. Therefore, the transmitted control information can be received using the frame in embodiment 7-2.

Figure 9:
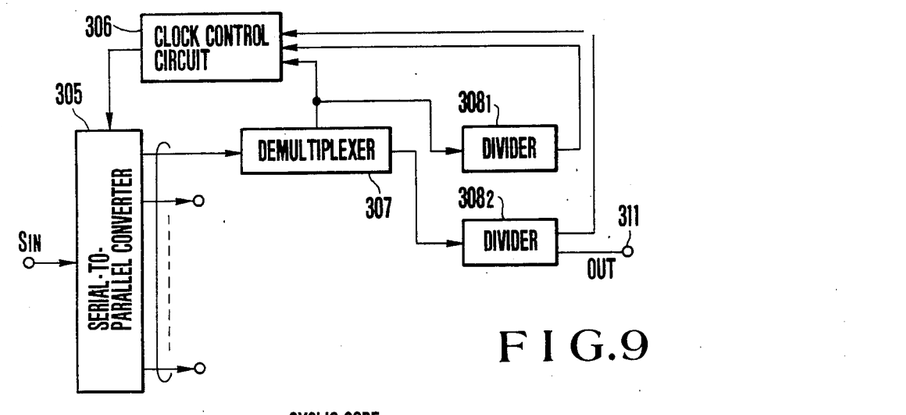
FIG. 9 is a block diagram of another arrangement showing part of the synchronization detector for the frame in FIG. 7.

FIG. 9 shows another arrangement of part of the synchronization detector for the frame in FIG. 7. The same reference numerals as in FIG. 8 denote the same parts in FIG. 9. The differences between the operations of the detectors in FIGS. 8 and 9 will be described in detail. Information lines of two parallel signals from a serial-to-parallel converter 207 are respectively input to two dividers $308_1$ and $308_2$, so that the code polynomials of 7-bit code words whose bits are extracted from the even- and odd-numbered sub-frames can be divided by the generating polynomial (4). Although the circuit size is slightly increased in this case, hunting for the time required for assuring sub-frame synchronization in nonsynchronization state is a maximum of (M−1) where M is the sub-frame length even if the frame in embodiment 7-1 is used. Therefore, the synchronization restoration time in the worst case is (M−1)×1 frame (seconds).

Figure 10:
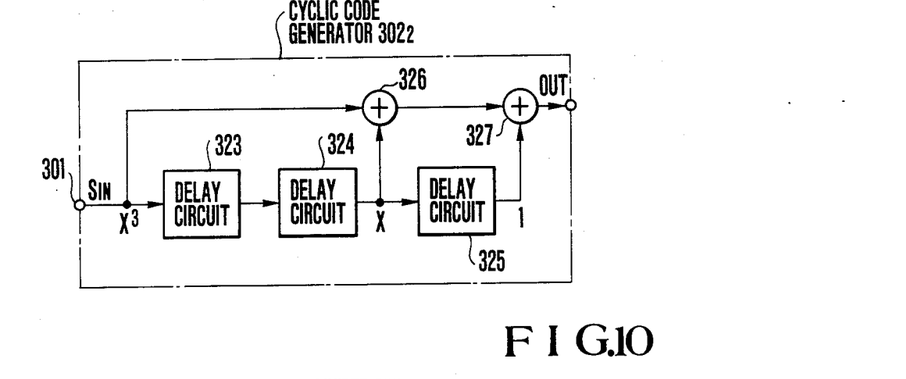
FIG. 10 is a circuit diagram of a cyclic code generator in FIG. 8.
Figure 11:
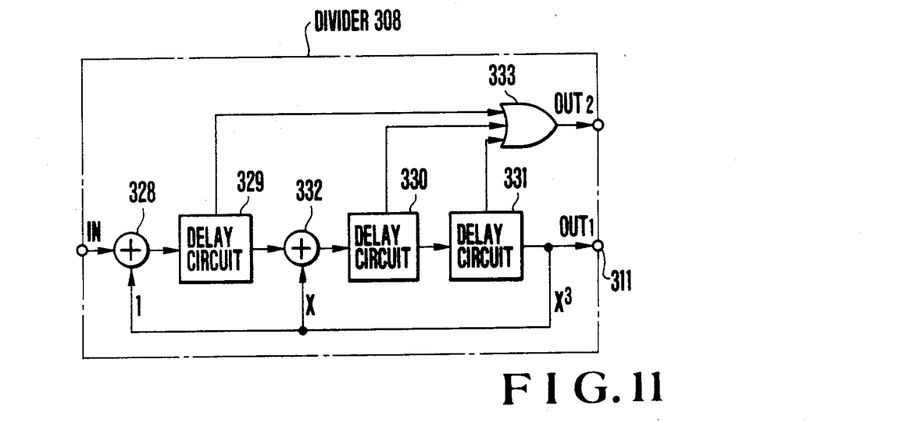
FIG. 11 is a circuit diagram of a divider in FIG. 8.

FIGS. 10 and 11 show the detailed arrangements of the cyclic code generator $302_2$ and the divider 308 in FIG. 8. Referring to FIG. 10, reference numerals 323, 324, and 325 denote one-sub-frame delay circuits; and 326 and 327, adders of modulo 2, respectively. Referring to FIG. 11, reference numerals 328 and 332 denote adders of modulo 2; 329, 330, and 331, one-sub-frame delay circuits; and 333, a control gate (OR circuit).

The delay circuits 323, 324, and 325 and the delay circuits 329, 330, and 331 are cleared for every one frame, and multiplication and division are performed by using the generating polynomial for every frame. Therefore, a seven-bit cyclic code can be generated within the one-frame period. The code polynomial having the 7-bit trains as the coefficients can be divided by the generating polynomial within the one-frame period. The remainder appears as an output (OUT 2) of the control gate 333.

In the above description, the number of sub-frames within one frame is 14, and the generating polynomial is $1+X+X^3$. However, the present invention is not limited to such a combination. Various other combinations may also be used.

According to the synchronization detection system according to the present invention, the overhead of the volume of frame pattern signals to the volume of transmission data can be improved, synchronization detection can be easily performed, and the average nonsynchronous duration characteristics can also be greatly improved as compared with the conventional arrangement.

The present invention can be suitably applied to a high-speed, large-capacity transmission system and is expected to allow a variety of applications in a transmission system of a higher speed and a larger capacity.

What is claimed is:

1. A frame synchronization detection system in a digital transmission system, wherein a frame consisting of N sub-frames each consisting of M bits is synchronized, comprising:

at a sending side,
means for generating an N-bit cyclic code from a generating polynomial and sequentially and respectively inserting bits of the cyclic code in bit positions of the sub-frames; and at a receiving side,
means for extracting a reception signal for every M bits and producing an N-bit data train,
dividing means for dividing a code polynomial having N-bit values of the N-bit data trains as coefficients by the generating polynomial to output a remainder, and
clock control means for sending a frame synchronization clock signal to said N-bit data train producing means when the remainder from said dividing means is zero.

2. A system according to claim 1, wherein the bits of the N-bit cyclic code are respectively inserted in MSBs of the sub-frames.

3. A system according to claim 1, further comprising:
at the sending side,
means for sequentially and respectively inserting N bits of an N-bit frame pattern in bit positions of (M−1) bits of the sub-frames which exclude the bit positions corresponding to the bits of the cyclic code; and wherein
at the receiving side,
said clock control means comprises memory means for storing the frame pattern, the synchronization clock signal being generated by using the remainder from said dividing means and the frame pattern stored in said memory means.

4. A system according to claim 3, wherein the frame pattern and the cyclic code are respectively inserted in the MSB and an LSB of each sub-frame.

5. A frame synchronization detection system in a digital transmission system, wherein a frame consisting of N sub-frames each consisting of M bits, comprising:
at a transmitting end,
means for dividing N bits selected from the sub-frames into K trains (K is a factor of N) and inserting an N/K-bit frame synchronization pattern in one of the K trains,
means for sequentially inserting (K−1) cyclic codes, each comprising an N/K-bit word generated from a generating polynomial, in one of remaining (K−1) trans, and
means for sending out as serial information a frame with the cyclic codes and the synchronization pattern; and
at a receiving side
first serial-to-parallel converting means for extracting a reception signal for every M bits and producing an N-bit data train,
second serial-to-parallel converting means for dividing a code polynomial, having as coefficients N/K bits (N is a multiple of K) extracted from at least one train out of outputs from said first serial-to-parallel converting means, by a predetermined generating polynomial to obtain a remainder, and
means, coupled to an output of said second serial-to-parallel converting means and the remainder, for detecting synchronization by using K N/K-bit trains extracted from the data trains.

* * * * *